United States Patent
Dean et al.

(10) Patent No.: US 7,186,050 B2
(45) Date of Patent: Mar. 6, 2007

(54) POLE CONNECTOR ASSEMBLY AND METHOD FOR RACKS AND SHELVING

(75) Inventors: Douglas R. Dean, Snellville, GA (US); Peterjohn R. C. Walters, Conyers, GA (US)

(73) Assignee: L & P Property Management Company, South Gate, CA (US)

( * ) Notice: Subject to any disclaimer, the term of this patent is extended or adjusted under 35 U.S.C. 154(b) by 115 days.

(21) Appl. No.: 10/650,096

(22) Filed: Aug. 26, 2003

(65) Prior Publication Data
US 2004/0104319 A1 Jun. 3, 2004

Related U.S. Application Data

(63) Continuation-in-part of application No. 10/085,179, filed on Feb. 27, 2002, now Pat. No. 6,626,605.

(51) Int. Cl.
*B42F 13/00* (2006.01)

(52) U.S. Cl. .................... 403/344; 403/369; 403/379.6

(58) Field of Classification Search ............... 248/146; 403/172, 97, 344, 375, 369, 370, 368, 379.6, 403/DIG. 12, 297; 108/147.11, 147.12, 147.13, 108/147.15; 211/90.01, 90.02, 119.003
See application file for complete search history.

(56) References Cited

U.S. PATENT DOCUMENTS

| | | | |
|---|---|---|---|
| 470,514 A | 3/1892 | Simpson | |
| 582,948 A | 5/1897 | Pinover | |
| 618,639 A | 1/1899 | Bullard | |
| 1,051,427 A | 1/1913 | McCluskey | |
| 2,356,199 A | 8/1944 | Battermann | |
| 2,703,724 A | 3/1955 | Yuen et al. | |
| 2,868,602 A | 1/1959 | Drezner | |
| 3,004,784 A | 10/1961 | Selby | |
| 3,461,772 A | 8/1969 | Barry | |
| 4,068,346 A | 1/1978 | Binder | |

(Continued)

FOREIGN PATENT DOCUMENTS

FR 745561 1/1932

(Continued)

OTHER PUBLICATIONS

"Current Split Pole Joining Methods" sheet, dated Apr. 18, 2001.

*Primary Examiner*—Amy J. Sterling
(74) *Attorney, Agent, or Firm*—Michael Best & Friedrich

(57) ABSTRACT

A pole connector assembly for connecting adjacent pole sections in order to construct a pole. In some embodiments, these pole connector assemblies have two inserts connected together by a fastener. Each of the two inserts can be received within an open end of a respective pole section. The fastener can be received within an aperture in each of the inserts in order to connect the pole sections together. In some embodiments, each insert can have at least one projection that extends into the pole section within which the insert is received. The fastener can limit the at least one projection from being inwardly deflected in order to secure the insert within the corresponding pole section. In other embodiments, the fastener can have at least one deformable portion to allow the fastener to secure the insert within the corresponding pole section.

39 Claims, 9 Drawing Sheets

U.S. PATENT DOCUMENTS

| | | |
|---|---|---|
| 4,141,554 A | 2/1979 | Sherwin |
| 4,147,444 A | 4/1979 | Herb et al. |
| 4,164,084 A | 8/1979 | Crockett |
| 4,484,407 A | 11/1984 | Petersson |
| 4,595,107 A | 6/1986 | Welsch |
| 4,627,543 A | 12/1986 | Nicely |
| 4,645,473 A | 2/1987 | Mochizuki |
| 4,754,712 A | 7/1988 | Olson et al. |
| 4,809,401 A | 3/1989 | Honig |
| 4,952,092 A | 8/1990 | Ballerstein |
| 4,958,953 A | 9/1990 | Charondiere |
| 4,997,304 A | 3/1991 | Choy |
| 5,409,122 A | 4/1995 | Lazarus |
| 5,429,447 A | 7/1995 | Wood |
| 5,688,066 A | 11/1997 | Loose |
| 5,704,728 A | 1/1998 | Chan |
| 5,779,070 A | 7/1998 | Dickinson et al. |
| 5,803,843 A | 9/1998 | Anderson et al. |
| 5,881,653 A | 3/1999 | Pfister |
| 5,902,420 A | 5/1999 | Wissenbach et al. |
| 6,045,291 A | 4/2000 | Ruehle et al. |
| 6,065,407 A | 5/2000 | Wang |
| 6,095,713 A | 8/2000 | Doyle et al. |
| 6,241,108 B1 | 6/2001 | Nakatani et al. |
| 6,247,414 B1 | 6/2001 | Sikora et al. |
| 6,260,488 B1 | 7/2001 | Yang et al. |
| 6,287,044 B1 | 9/2001 | Huber |
| 6,352,439 B1 | 3/2002 | Stark et al. |
| 6,431,784 B1 * | 8/2002 | Kronenberg ................ 403/297 |
| 6,511,099 B2 * | 1/2003 | Bartholoma et al. ..... 285/140.1 |
| 6,764,247 B1 * | 7/2004 | Kronenberg ................ 403/292 |
| 2003/0118397 A1 * | 6/2003 | Hasler ........................ 403/297 |

FOREIGN PATENT DOCUMENTS

| | | |
|---|---|---|
| FR | 879842 | 11/1941 |
| FR | 1.278.327 | 1/1961 |
| FR | 1.451.785 | 8/1965 |
| GB | 405110 | 1/1933 |
| GB | 591253 | 6/1946 |

* cited by examiner

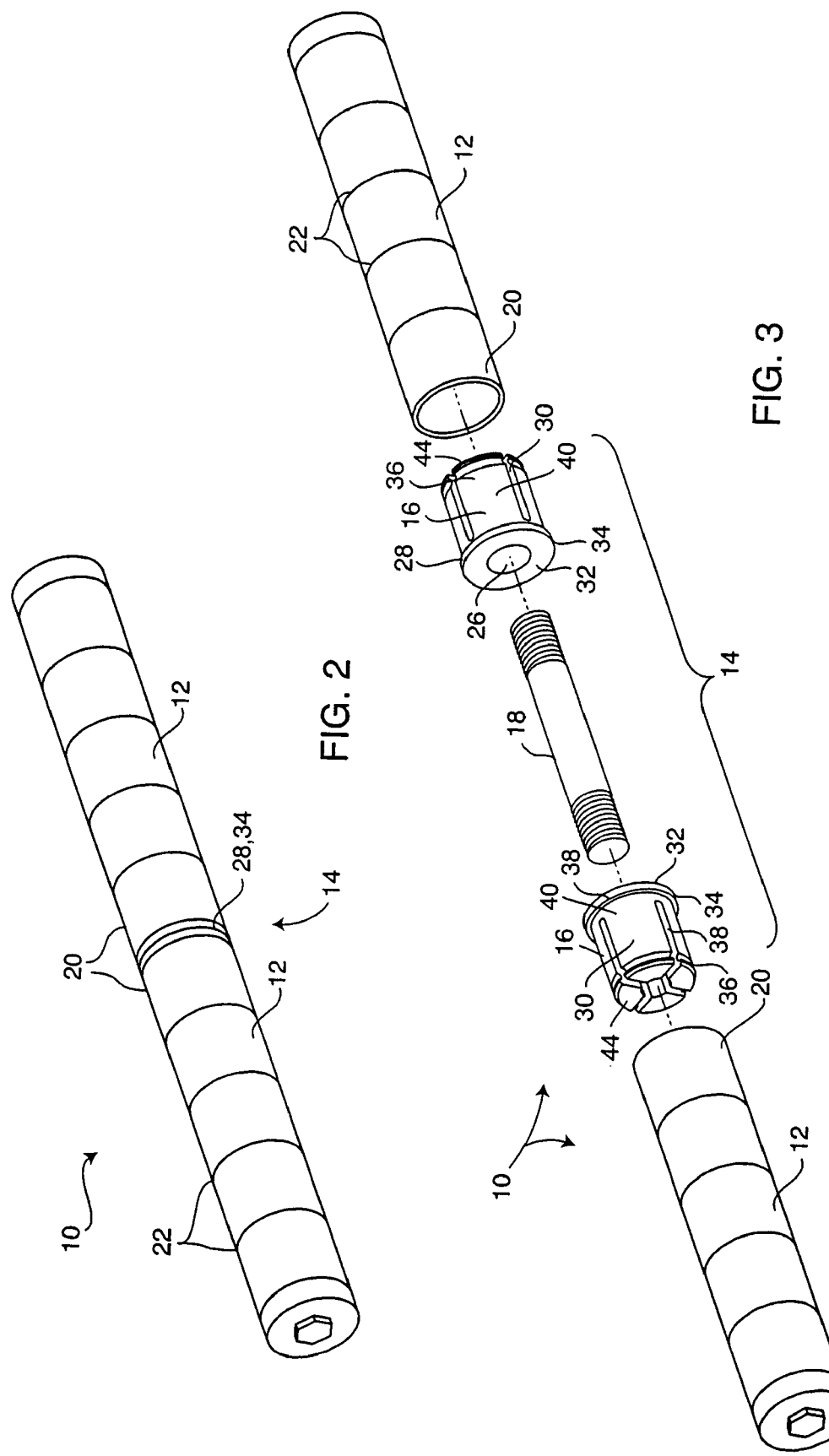

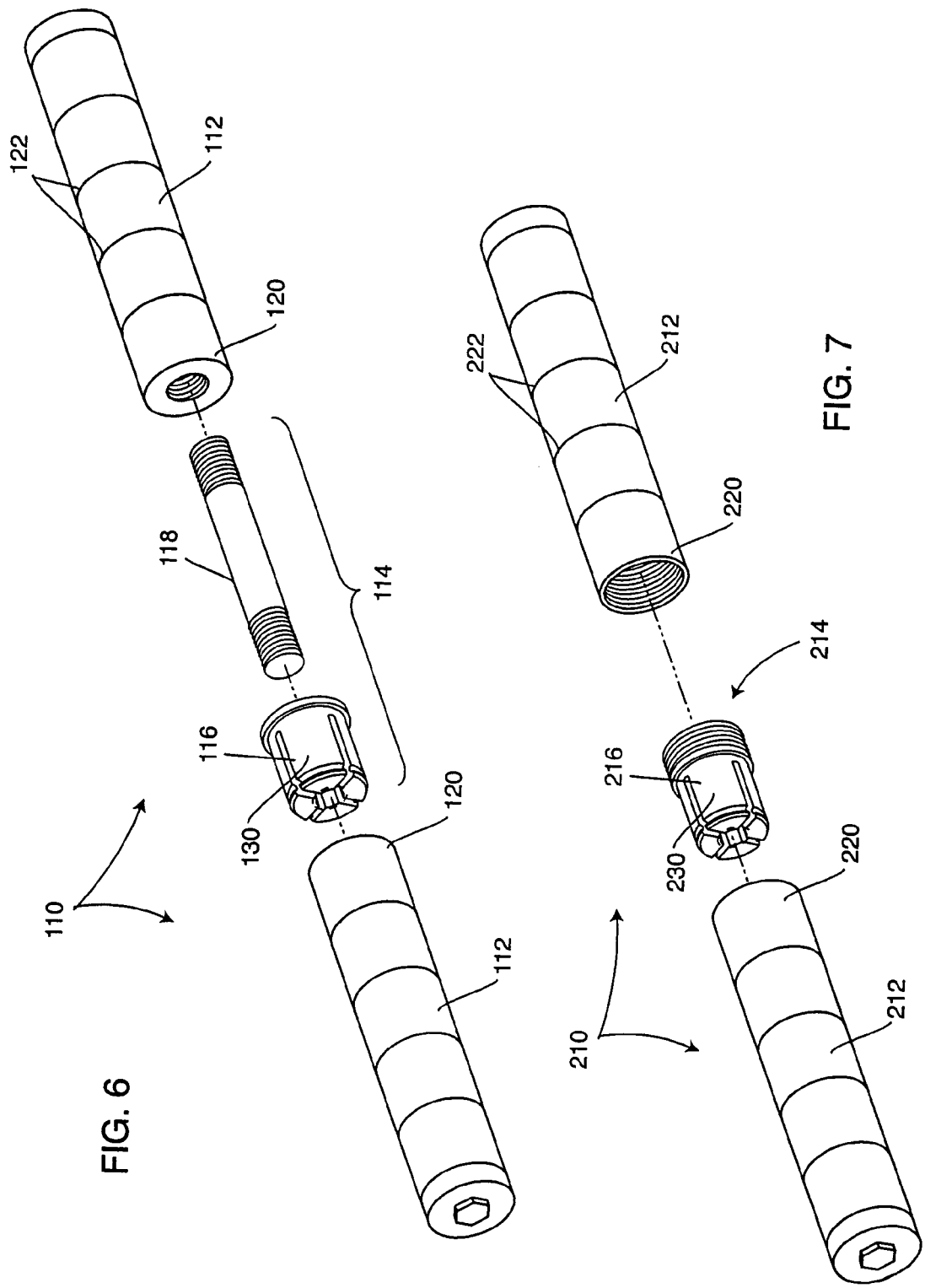

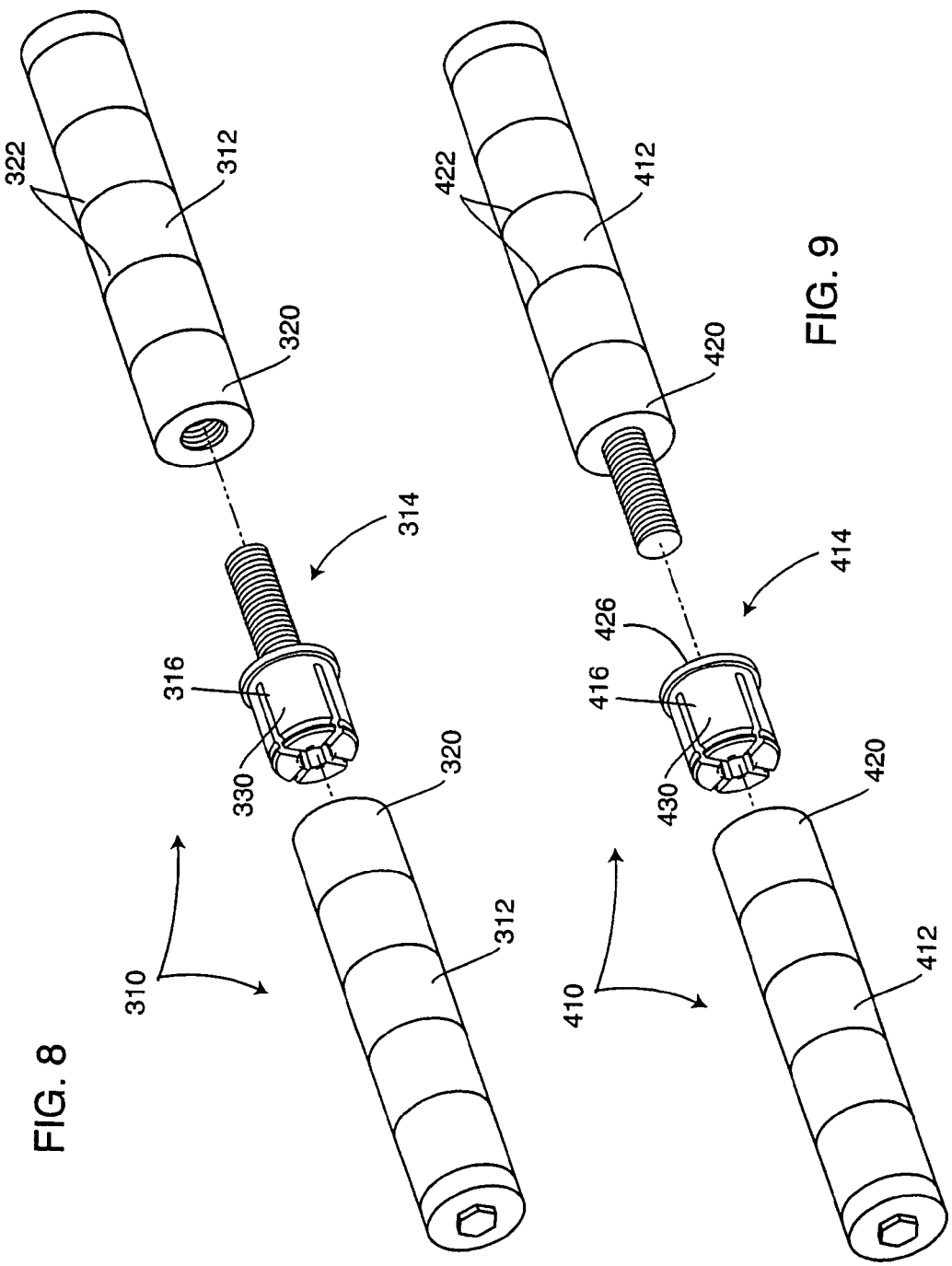

POLE CONNECTOR ASSEMBLY AND METHOD FOR RACKS AND SHELVING

CROSS-REFERENCE TO RELATED APPLICATION

This is a continuation-in-part of U.S. patent application Ser. No. 10/085,179 filed on Feb. 27, 2002, now U.S. Pat. No. 6,626,605 the entire disclosure of which is incorporated herein by reference.

FIELD OF THE INVENTION

The present invention relates to pole connector assemblies and devices, and more particularly to pole connector assemblies and devices for joining support post sections used in adjustable racks, shelving, and similar applications.

BACKGROUND OF THE INVENTION

Many existing shelving and rack systems are constructed of one or more poles connected to one or more shelves or racks. In some cases, the shelves or racks can be adjustably connected to the poles at different heights. Also, each pole often includes two or more pole sections that are connected in an end-to-end fashion by pole connector devices or assemblies. Pole connector devices and the poles assembled with such devices are preferably strong, lightweight, easy to assemble (and in some cases, disassemble), and relatively inexpensive. However, existing pole connector devices fail to balance these design considerations well, invariably resulting in pole connector device designs that are lacking in one or more respects. Conventional pole connector devices and assemblies are often unreliable, heavy, slow to assemble and disassemble, expensive to manufacture, and difficult to properly align and adjust.

For example, many conventional pole connector devices include a plurality of pole inserts that are inserted into the ends of pole sections. These pole connector devices are used to connect adjacent pole sections in end-to-end fashion as mentioned above. Such pole connector devices can have one or more exterior threaded surfaces. Many types of pole inserts are die cast, and have threads machined into the exterior surface(s) of the inserts. The threaded pole inserts are threaded into threaded ends of the pole sections to connect the pole inserts to the pole sections and to connect adjacent pole sections together.

Some existing threaded inserts are formed of a single piece or assembly having a separate threaded portion on each end of the insert for threaded connection with an internally threaded pole section. Other threaded inserts are threaded only on one end for threaded connection with a pole section. In such cases, the threaded inserts are inserted into the ends of adjacent pole sections and are then connected together with a fastener to connect the adjacent pole sections. By way of example only, the fastener can be rod threaded on each end. After the inserts are inserted into the ends of adjacent pole sections, one end of this fastener type is threaded into a threaded aperture in one of the inserts. The opposite end of the fastener is then threaded into a threaded aperture in the other insert and is tightened to connect the adjacent pole sections together.

The machining required for threading conventional pole inserts is expensive and can represent a significant part of the cost of a shelving and rack system. Such machining also adds an additional step in the manufacturing process and can significantly add to the time needed to produce a shelving and rack system. Although a number of alternatives exist to machining threads into the pole inserts and pole section ends (e.g., casting or molding threads), each of these alternatives adds significant costs to the manufacturing process in one or more ways, such as through expensive molds and molding machinery, etc.

The use of threaded pole inserts can also add significant time to the pole assembly process, especially when several pole sections and several rack or shelf systems need to be assembled. Such inserts and pole sections can be difficult to thread together, and in some cases may not properly align to form a straight pole. Some pole connections may be used to connect two or more poles in a way that joins the poles in other manners, such as at any angle or in a parallel fashion but not necessarily co-axial. In such cases, threaded connections can be cumbersome and ineffective. If threaded correctly, an insert threads into a pole along a central pole axis extending parallel to the walls of the pole. In some cases, the threads on the insert may become misaligned with the threads of the pole during assembly, causing the insert to become misaligned with respect to the pole axis and result in an unstable pole connection. Such unstable pole connections can be difficult to detect by the assembler. In addition to misalignment problems, the process of tightening the pole inserts into the pole sections during assembly and of loosening such connections during disassembly can be difficult, often requiring significant strength and/or tools. Also, threaded inserts can loosen as a result of rack or shelf use and vibration, resulting in unreliable connections between pole sections.

Other types of pole section connectors do not employ threaded connections to the pole sections. For example, some pole section connectors employ inserts that are received into the ends of the pole sections and are attached thereto by adhesive or cohesive bonding material. Such pole section connectors can be difficult to properly align (while the bonding material sets and/or while the inserts are assembled with the pole sections). It can also be difficult for an assembler or user to detect when the bonding material has failed or is otherwise unsatisfactory for bearing normal loads. In addition, the use of bonding material for pole section connections can make pole disassembly problematic or even impossible.

In light of the problems and limitations described above, a need exists for pole assembly connectors that enable quick assembly and disassembly of rack or shelf poles, can be inexpensively manufactured, are easy to properly align and assemble, and provide a strong and reliable connection between pole sections. Each preferred embodiment of the present invention achieves one or more of these results.

SUMMARY OF THE INVENTION

In one aspect of the present invention, a pole connector assembly is employed between adjacent pole sections in order to construct a pole. Some preferred embodiments of the pole connector assembly have two inserts connected together by a fastener. Each of the two inserts is received within an open end of a respective pole section. The fastener is preferably received within an aperture in each of the inserts in order to connect the pole sections together.

In some preferred embodiments of the present invention, each insert has at least one projection that extends into the pole section in which the insert is received. Preferably, the projection can be deflected in order to engage (or more fully engage) the insert within its corresponding pole section. The projection can be deflected by the fastener or by one or more internal surfaces of the pole section as the insert is inserted within the pole section.

Preferably, the fastener is received within the aperture of the insert as mentioned above. By inserting the fastener in the aperture, the fastener preferably deflects the projection to engage the inside surface of the pole section and to thereby secure the insert in the pole section. In some preferred embodiments, the fastener and the aperture in the insert are threaded so that threading the fastener in the insert aperture causes the projection to deflect and to engage the inside surface of the pole section. In other preferred embodiments, the fastener extends into the insert aperture to a position in which the fastener is secured within the insert aperture. For example, the fastener can have at least one projection that is deflectable in order to engage (or more fully engage) the fastener within its insert. If employed, the at least one projection can further include an enlarged end that interengages an inwardly-opening groove in the corresponding insert to more fully secure the fastener within the insert.

Any number of insert projections can be employed for purposes of securing an insert to a pole section. However, the insert most preferably has a plurality of such projections, each separated by a space so that each can be deflected with respect to the others. For example, the insert can have four projections that surround the aperture within which the fastener is received. The four projections can be separated by grooves in the insert (which grooves can be cuts made in the insert to define the four projections). When the fastener is inserted within the aperture, such as by being threaded into the aperture, the four projections expand and deflect from one another, and thereafter contact and preferably press against the inside surfaces of the pole section in which the insert is installed.

The projections of the inserts can engage with the pole sections in different manners in order to secure the inserts within the pole sections. In some cases, the projections press against the interior surfaces of the pole sections and thereby frictionally engage the inserts with the pole sections. In these and in other cases, the projections can have one or more features that mate or otherwise engage with one or more features on the inside of the pole section upon deflection of the insert projections. For example, the projections can have a circumferential groove therein which mates with a circumferential tongue on the inside of the pole section. The circumferential tongue can be defined by a circumferential recess on the exterior of the pole section. Such recesses are commonly used to connect racks and shelves to poles. When the grooved projections of the insert are deflected, the grooves on the insert mate with the internal tongue of the pole section to engage the insert with the pole section Still other types of engagable elements and features on the deflectable projections and on the pole sections are possible, each one of which falls within the spirit and scope of the present invention. Furthermore, any of the above types of engagement can also apply to engagement between one or more deflectable projections of a fastener, if employed, and a corresponding insert.

In some embodiments of the present invention, the inserts each have a cap portion that is preferably larger than the inner diameter of the pole sections being connected and that preferably abuts the end of a pole section. Although the inserts do not require a cap portion, this feature provides additional stability to the pole connection assembly. Also, the cap portion (e.g., a peripheral edge of the cap portion) can be chamfered, beveled, or otherwise recessed so that the pole connector assembly has a circumferential groove at the pole section interface to which shelves and racks can be connected.

The elements making up the pole connector assembly of the present invention are relatively simple and inexpensive to manufacture, particularly because a number of the embodiments employ only one threaded connection for each insert (as opposed to two threaded connections commonly used in existing pole connectors). In addition, the snap-fit and positive engagement provided by the inserts of the present invention help to provide a more reliable and stronger pole connection that is also easier to align and adjust. Also, assembly of the various embodiments requires minimal strength and skill, with no need to employ bonding agents or to align parts during the assembly process.

More information and a better understanding of the present invention can be achieved by reference to the following drawings and detailed description.

BRIEF DESCRIPTION OF THE DRAWINGS

The present invention is further described with reference to the accompanying drawings, which show a preferred embodiment of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

In the drawings, wherein like reference numerals indicate like parts:

FIG. 2 is perspective view of a pole illustrated in FIG. 1;

FIG. 3 is an exploded perspective view of the pole illustrated in FIGS. 1 and 2;

FIG. 6 is an exploded perspective view of a pole and pole connector assembly according to a second preferred embodiment of the present invention;

FIG. 7 is an exploded perspective view of a pole and pole connector assembly according to a third preferred embodiment of the present invention;

FIG. 8 is an exploded perspective view of a pole and pole connector assembly according to a fourth preferred embodiment of the present invention;

FIG. 9 is an exploded perspective view of a pole and pole connector assembly according to a fifth preferred embodiment of the present invention;

DETAILED DESCRIPTION

Figure 1:
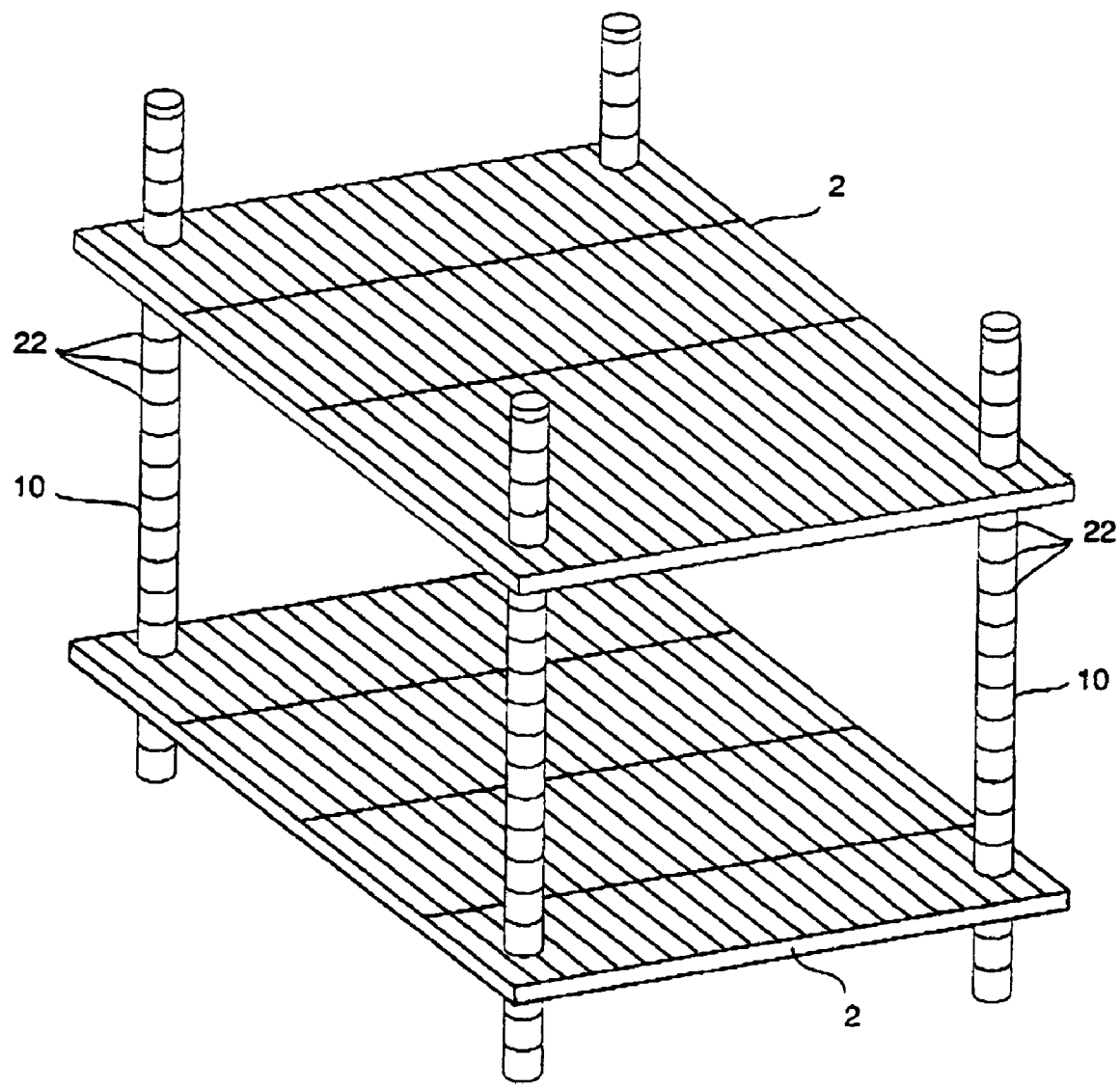
FIG. 1 is a perspective view of a shelf assembly employing poles according to a first preferred embodiment of the present invention.

The present invention is described in terms of its application to poles for adjustable and non-adjustable shelves and racks such as that shown in FIG. 1. An example of such a shelf assembly is disclosed in U.S. Pat. No. 4,852,501 issued to Olson et al., the disclosure of which is incorporated herein by reference insofar as it relates to shelf assemblies and adjustable shelf assemblies. However, the present invention can be employed in any application in which two pole sections must be connected in an end-to-end fashion.

FIGS. 2 and 3 illustrate a pole according to one preferred embodiment of the present invention. The pole 10 has at least two pole sections 12 connected in end-to-end fashion as will be described in greater detail below. Although the pole 10 in FIGS. 2 and 3 has only two pole sections 12, it should be noted that a pole 10 having any number of pole sections 12 and pole section lengths is possible according to the present invention.

Figure 5:
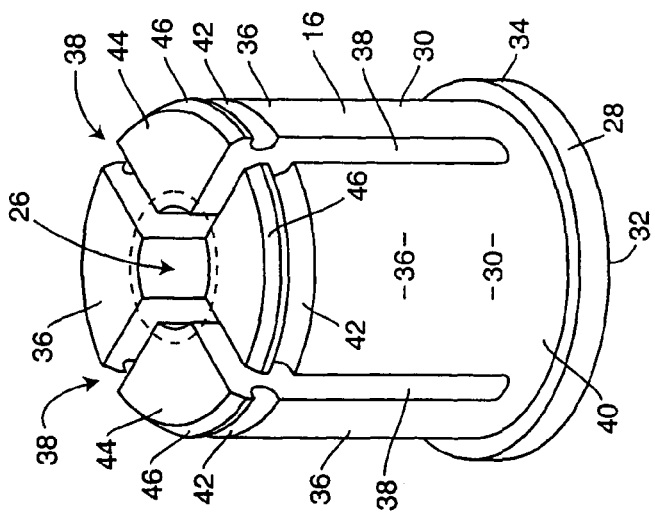
FIG. 5 is an elevational cross-sectional view of a pole connector assembly illustrated in FIGS. 2 and 3.

FIGS. 3 and 5 illustrate a pole connector assembly (indicated generally at 14) according to a preferred embodiment of the present invention. The pole connector assembly 14 includes two inserts 16 and at least one fastener 18. As will be described in greater detail below, each insert 16 is inserted into an end 20 of a pole section 12 to be joined to another pole section 12. Preferably, the fastener 18 connects the inserts 16 together.

Each pole section 12 preferably has a hollow cylindrical shape with a central axis, and includes at least one open end to which the pole connection assembly 14 is connected. The opposite end of each pole section 12 can be open (whether for connection to another pole connection assembly or otherwise) or can be closed.

The pole sections 12 can have any cross-sectional shape desired, including without limitation round, oval, elliptical, rectangular, triangular, or other polygonal cross sectional shapes, and poles having irregular or unusual cross-sectional shapes. Although the cross-sectional size and shape of each pole section 12 is preferably constant along its length, this need not necessarily be the case.

Some preferred embodiments of the pole sections 12 have a plurality of external circumferential recesses or grooves 22. As is well known to those skilled in the art, these grooves 22 can be used to secure shelves or racks to the poles 10. Preferably, multiple grooves 22 enable the attachment of multiple shelves or racks 2 (see FIG. 1) to the poles 10 and/or permit the shelves or racks 2 to be secured at a variety of points along the poles 10. The manner in which racks or shelves can be connected to a grooved pole 10 is well-known to those skilled in the art and is not therefore described further herein. In other embodiments of the present invention, the pole sections 12 can be provided with other features and elements enabling connection of racks or shelves 2 to the poles 10. Such features and elements include without limitation a plurality of apertures along the pole sections 12, ribs, studs, bosses, flanges, lips, pins, or other protrusions extending from the surface of the pole sections 12, and the like. In still other embodiments of the present invention, the surfaces of the pole sections 12 are relatively featureless (such as when clamps, setscrews, or other fasteners are used to clamp the racks or shelves 2 in place on the pole sections 12).

The insert 16 is inserted into the open end of the pole section 12 and preferably snaps into place within the pole section 16. As will be described in greater detail below, the insert 16 preferably has a snap engagement with a tongue 24 or other protrusion on the inside of the pole section 12 formed by at least one of the recesses 22 in the pole section 12. More specifically, the tongue 24 preferably provides a snapping location for the insert 16 when the insert 16 is inserted into the open end of the pole section 12. Other manners of engagement between the insert 16 and the pole section 12 are possible and will also be described in greater detail below.

Each insert preferably has a cross-sectional shape that is similar or corresponds to the cross sectional shape of the pole section end 20 into which the insert 16 is received. However, the insert can take any other shape desired that is capable of connection with the pole section end 20 as described below. In the illustrated preferred embodiment, the inserts 16 and pole sections 12 have generally round cross sections by way of example only.

Figure 4:
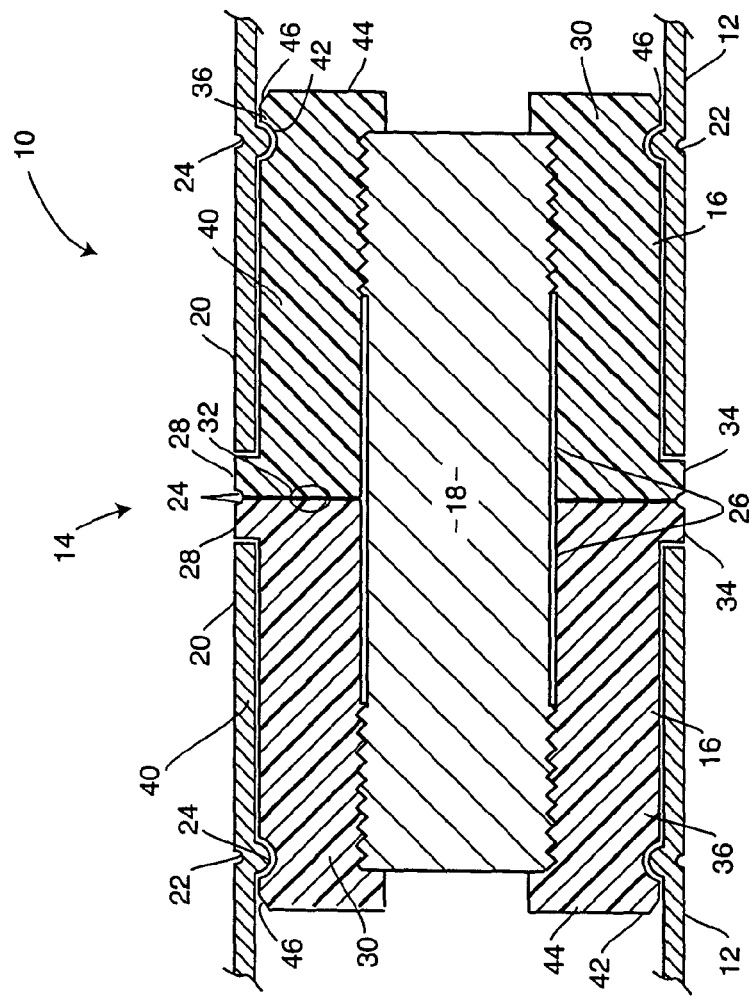
FIG. 4 is a perspective view of an insert of a pole connector assembly illustrated in FIG. 3.

With reference to FIGS. 3–5, some embodiments of the present invention employ an insert 16 having an aperture 26 therein for receiving a fastener 18. The insert 16 preferably also has a body portion 30 that at least partially extends into the end 20 of a pole section 12. Also, the insert 16 preferably has a cap portion 28 that is located at least partially outside of the pole section 12. Although the cap portion 28 preferably has a cross-sectional shape that is similar to that of the body portion 30, the cap portion 28 can have any other cross-sectional shape desired.

The cap portion 28 of the insert 16 is preferably larger in diameter than the body portion 30, and is also preferably larger in diameter than the internal diameter of the pole section 12. Therefore, the cap portion 28 can abut the end of the pole section 12 to "cap" the pole section 12. In some preferred embodiments of the present invention, the cap portion 28 has an outer diameter that is the same or substantially the same as the outer diameter of the pole section 12. However, the cap portion 28 can have a larger diameter if desired. In those embodiments where it is not desired or necessary to have a surface of the cap portion 28 abut the end 20 of the pole section 12, the cap portion 28 can be smaller in diameter than the wall defining the pole section 12.

The insert 16 preferably has a surface 32 that faces away from the pole section 12 into which the insert 16 is inserted. This interface surface 32 can be substantially flat and featureless or can have any shape desired (e.g., concave, convex, grooved, ribbed, and the like). A substantially flat interface surface 32 is highly preferred to produce a stable interface with a confronting insert 16 as will be described in greater detail below.

In some embodiments, the peripheral edge of the interface surface 32 can have a shape that is complimentary with the peripheral edge of the interface surface 32 of a confronting insert 16. For example, and with continued reference to FIGS. 3–5, the peripheral edge 34 of the interface surface 32 preferably has a circumferential groove, chamfer, or other recess defined therein. When placed in an abutting relationship with another confronting insert 16, the resulting peripheral interface between the inserts 16 can be a recess having any desired shape. In some preferred embodiments, this recess shape is similar to recesses located at other points along the pole sections 12. As another example, the peripheral edge 34 of the interface surface 32 can have one or more lips, ledges, extensions, or other protrusions that define any desired shape of the interface between confronting inserts 16 when abutted against one another. Although similarly-shaped abutting inserts 16 are highly preferred to generate an interface shape between two abutting inserts 16 as just described, in some embodiments only one of the abutting inserts 16 may have a recess, protrusion, or other feature in the peripheral edge 34 of the interface surface 32. In still other embodiments, neither insert 16 has such a feature.

Whether either or both peripheral edges 34 of abutting inserts 16 have recesses, protrusions, or other features, the resulting exposed external surfaces of the abutting inserts 16 can be shaped to mimic or duplicate external features of the pole sections 12 (including those portions of the pole sections 12 to which shelves or racks 2 can be connected as described above). For example, the shape of the interface between the abutting inserts 16 in the illustrated preferred embodiment can be the same or similar to the shape of the recesses 22 in the pole sections 12. The interface between abutting inserts 16 can therefore define another location at which shelves or racks 2 can be connected to the pole 10. Alternatively, any other external surface of either or both abutting inserts 16 can be shaped for this purpose.

The body portion 30 of the insert 16 preferably has a generally round cross-sectional shape. As described above, however, the insert 16 (and the body portion 30 thereof) can have any cross-sectional shape desired. The body portion 30 of the insert 16 preferably extends away from the cap portion 28 along the axis of the insert 16 in a direction opposite the interface surface 32. The body portion 30 is preferably slightly smaller than the inside of the pole section end 20. For example, for generally round pole sections 12 and inserts 16 as illustrated in the figures, the body portion 30 preferably has a diameter slightly smaller than the inner diameter of the end 20 of the pole section 12. Most preferably, a clearance fit exists between the body portion 30 and the pole section 12, although a light interference fit can be used in some embodiments. The fit between the body portion 30 of the insert 16 and the end 20 of the pole section 12 can therefore be loose, snug, or relatively tight as desired.

The body portion 30 of the insert 16 preferably has one or more projections 36 that extend away from the interface surface 32 of the insert 16. In some preferred embodiments, the projections 36 extend in a direction generally parallel to the axis of the insert 16. The insert 16 is preferably made of a strong and resilient material such as steel, aluminum, or other metal, high-strength plastic, composites, and the like. The projections 36 can be separate elements attached to the remainder of the insert 16 in any conventional manner (such as by welding, soldering, or brazing, by one or more conventional fasteners, by a press fitting or threaded connection with the remainder of the insert 16, and the like). More preferably however, the projections 36 are integral with the remainder of the insert 16.

As will be described in greater detail below, the projections 36 can be slightly deflected under stress during insertion and connection of the insert 16 into the pole section 12. Because the insert (or at least the projections 36 thereof) is preferably made of resilient material, the projections are inherently biased toward their pre-stressed states.

Although four projections 36 are illustrated in the embodiment of FIGS. 3–5, any number of projections can be used as desired. Most preferably, two or more projections 36 are employed, and are separated by spaces to permit a degree of flexibility of the projections 36 with respect to one another and the pole section 12. In the illustrated preferred embodiment for example, the four projections 36 are separated by slots 38 that are substantially parallel to the axis of the insert 16. The slots 38 extend from a base 40 of the body portion 30 to the ends of the projections 36.

The projections 36 can each have any cross-sectional shape desired, and preferably collectively define a body shape that is similar to the internal shape of the pole section end 20 as discussed above. For example, the projections 36 in the insert illustrated in FIGS. 3–5 are elongated and have a semi-annular cross-sectional shape. In other embodiments, the projections 36 can be a series of elongated fingers each having a round, oval, polygonal, or other cross-sectional shape that may or may not vary along the length of the projections 36. Furthermore, the projections 36 can each have the same or different cross-sectional shapes and lengths as desired.

In some preferred embodiments of the present invention, the inserts 36 are engagable with one or more interior projections or features within the pole sections 12, thereby resulting in a strong and reliable connection between the inserts 36 and the pole sections 12. By way of example only, the projections 36 in the illustrated preferred embodiment have an external groove 42 that preferably circumscribes the body portion 30 of the insert 16 and is formed in the outer surfaces of the projections 36. The groove 42 can lie in a plane generally perpendicular to the axis of the insert 16 as shown in the figures, or can be oriented in other manners as will be discussed in more detail below. The groove 42 is preferably located at a point along the body portion 30 of the insert 16, such that the groove 42 engages the tongue 24 (see FIG. 5) on the interior surface of the pole section 12 when the insert 16 is inserted into the open end 20 of the pole section 12 (and preferably, when the cap portion 28 contacts the pole section end 20 in those embodiments of the insert 16 having a cap portion 28). Although the groove 42 is preferably located near a distal end of the body portion 30, the groove 42 can be located anywhere along the body portion 30 in order to enable engagement of the groove 42 with the tongue 24 (when the cap portion 28 contacts the pole section end 20 or otherwise).

As mentioned above, the insert 16 in the illustrated preferred embodiment is preferably engagable with the pole section 12 by an engagement between the groove 42 in the projections 36 of the body portion 12 with a tongue 24 extending internally into the pole section 12. In some embodiments, the tongue 24 is defined at least partially by a recess 22 on the exterior surface of the pole section 10 as described above. In other embodiments, the tongue 24 can be defined by a separate element connected to or otherwise formed on an internal surface of the pole section end 20, such as a ring welded, press or snap-fit, brazed, or fastened with one or more conventional fasteners to the inside of the pole section end 20, a bead of metal or welding deposit left upon the interior surface of the pole section end 20, and the like.

A number of alternatives exist to the tongue and groove connection between the insert 16 and pole section 12 described above and illustrated in FIGS. 3–5. For example, the locations of the tongue 24 and the groove 42 can be reversed, whereby a tongue or other projection on the body portion 30 of the insert 16 is engagable with a groove or other recess in the inside surface of the pole section end 20. In other embodiments, the tongue and groove connection described above can be replaced by a number of other engagable elements and features of the insert 16 and pole section 12. By way of example only, one or more pins, knobs, fingers, ledges, ramps, bosses, or other projections on the body portion 30 of the insert 16 can be engagable with one or more similar elements or with one or more apertures, grooves, dimples, or other recesses in the inside wall of the pole section 12 (and vice versa). Like the tongue and groove connection described above, such a relationship between the body portion 30 of the insert 16 and the inside surface of the pole section 12 is preferably a snap fit to result in a strong and reliable connection between these elements.

Although the groove 42 in the illustrated preferred embodiment is preferably located on projections 36 of the insert 16 as described above, this need not necessarily be the case. Specifically, the groove 42 can be located on a body portion 30 having no identifiable projections 36. A groove 42 located on projections 36 of an insert 16 is preferred because the projections 36 permit flexure of the body portion 30 during insertion of the insert 16 into the pole end 20 and during connection of the tongue 24 within the groove 42. This flexure is enabled by the elongated nature of the projections 36 and, in the case of multiple projections 36, by the slots 38 or other spaces located between the projections 36 as described above. The flexure can result in a more secure connection of the insert 16 and the pole end 20 into which the insert 16 is received. However, in some cases a sufficiently strong and reliable connection is provided without any significant flexure of the projections 36. In other cases, such a connection is possible without the use of projections 36 at all.

The preceding discussion regarding the tongue and groove relationship between the insert 16 and the pole end 20 applies equally to other types of features and elements (described above) used to connect the insert 16 to the pole end 20. In any case, the feature or element(s) which engage with the insert 16 can be oriented in any manner with respect to the axis of the pole section 12. For example, the orientation of the tongue 24 in the pole end 20 can be at any angle with respect to the axis of the pole section 12. However, the orientation of the tongue 24 (or other element or feature to which the insert 16 connects) with respect to the pole section 12 is preferably dependent at least in part upon the orientation of the groove 42 in the pole end 20 to which the tongue 24 connects. Although one tongue and groove connection is preferably used to connect each insert 16 to a pole section 12, it will be appreciated by one having ordinary skill in the art that multiple tongues 24 and multiple grooves 42 can connect each insert 16 within a pole section 12 in a manner as described above.

In some preferred embodiments of the present invention, the projections 36 of the insert 16 also include a lead surface 44 having a tapered edge 46. The lead surface 44 is that surface of the body portion 30 that is located farthest from the cap portion 28 (when used) and from the interface surface 32 of the insert 16. Although not required, the lead surface 44 is preferably flat, and is in a plane generally perpendicular to the axis of the insert 16. Alternatively, the lead surface 44 can have any other shape desired and can be disposed at any angle or multiple angles with respect to the axis of the insert 16. The tapered edge 46 of the lead surface 44 facilitates easier insertion of the insert 16 into the end of the pole section 12. Also, the tapered edge 46 of the lead surface 44 can act as a ramp against which the tongue 24 of the pole section 12 rides as the insert 16 is inserted into the pole section 12. This ramping action can facilitate an easier snap-fit of the insert 16 into the pole section 12. In those embodiments of the insert 16 having projections 36 as described above, the tapered edge 46 of the lead surface 44 can also act as a ramp to deflect the projections 36 as the insert 16 is moved into an engaged position with respect to the pole section 12.

Preferably, when the insert 16 is inserted into an end 20 of the pole section 12, the projections 36 contact the tongue 24 in the pole section end 20 and then deflect under insertion force as the insert 16 is pushed into the pole section end 20. When the tongue 24 in the pole section end 20 becomes aligned with the groove 42 in the insert 16, the projections 36 preferably spring back or otherwise return to their pre-deflected state. This action of the projections 36 serves at least one of two purposes: to create a positive engagement of the tongue 24 and groove 42 and to generate a force of the projections 36 upon the inside of the pole section 12. As mentioned above, the tongue and groove connection between the insert 16 and the pole section 12 can be replaced by a number of other elements and structures also generating an engagement between the insert 16 and the pole section 12. In such cases, the resilient deflection and return of the projections 36 can function in a similar manner as described above with reference to the tongue and groove connection in the illustrated preferred embodiment. Although inter-engaging elements or features of the insert 16 and the pole section 12 are not required to practice the present invention, they can be employed to generate a stronger pole section connection in any of these manners.

As mentioned above, some embodiments of the present invention have inserts with resilient projections 36 used to engage with a pole section 12 by generating a pressure against the inside walls of the pole section end 20. Whether or not such resilient projections are also used to engage features or elements on the insert 16 and pole section end 20, this pressure can be sufficient to retain the insert 16 in place within the pole section 12 even under significant axial and torsional forces. To generate large frictional forces between the projections 36 and the inside walls of the pole section end 20, the projections 36 of the insert 16 can have a tight fit with the pole section end 20 as the insert 16 is pushed into the pole section end 20. Otherwise, the inside of the pole section end 20 can have a ramped or conical shape which narrows with increasing distance from the pole section end 20, a stepped inner diameter upon which the projections 36 ride as the insert 16 is pushed into the pole section end 20, or any other interior shape causing the projections to be inwardly compressed or otherwise deflected when the insert 16 is forced into the pole section end 20. As mentioned above, the insert 16 can have a tapered leading edge 46 to ease insertion of the insert 16 in any of these embodiments.

In some preferred embodiments of the present invention, the inserts 16 of adjacent pole ends 20 are connected together by a threaded fastener 18. For this purpose, the body portions 30 of the inserts 16 can have an internally-threaded aperture 26. In those embodiments of the inserts 16 having projections 36, this aperture 26 is preferably defined by the interior surfaces of the projections 36 (such as at the terminal half of the insert 16 ending at the lead surface 44 of the insert 16).

The fastener 18 is preferably threaded into the threaded portion of the insert 16. The fastener 18 is a threaded tube or rod as shown in FIGS. 3 and 5, and preferably has exterior threads on at least the ends of the fastener 18. Each end of the fastener 18 is preferably inserted into the aperture 26 of confronting inserts 16 in order to connect the poles 12 (to which the inserts 16 are connected) together. Preferably, the fastener 18 is threaded into the threaded apertures 26 of the inserts 16 until the interface surfaces 32 of the confronting inserts 16 contact one another to secure the inserts 16 and connected poles 12 together.

Although a separate fastener 18 is preferred in some embodiments of the present invention, it should be noted that the fastener 18 can be permanently connected, integral with, or defined by an extension or end of either of the inserts 16 in the pole connection assembly 14 (see, for example, FIG. 8).

In those embodiments of the present invention employing inserts 16 having projections 36, the fastener 18 can also assist in securing or further securing the inserts 16 within the pole sections 12. Specifically, as the fastener 18 is threaded into the threaded apertures 26 of the inserts 16, the fastener 18 preferably forces the projections 36 radially outward from the axis of the insert 16. As the projections 36 are forced outward from the axis, the projections 36 preferably press against the interior surface of the pole section 12, thereby generating a tighter fit of the insert 16 within the end 20 of the pole section 12. This action also preferably generates further engagement of the elements or features connecting the insert 16 to the pole section 12 as described above (e.g., tongue 24 and groove 42 in the illustrated preferred embodiment), thereby resulting in a more secure insert-pole section connection. Although the fastener 18 of the present invention need not assist in engaging features or elements of the insert 16 and pole section 12 and need not assist in increasing pressure and frictional force between these elements, these functions are highly preferred for improved pole connection strength.

Inserts 16 having projections as described above are most preferred due to their ability to expand in order to create a better engagement of the inserts 16 within the pole sections 12. Whether expandable by a fastener 18 as described above or not, such projections can also provide a snap-fit engagement of the insert with the pole section 12. In this regard, it should be noted that in some embodiments of the present invention, the fastener 18 is permanently secured to either or both inserts 16 or is integral to either or both inserts 16. In such cases, the insert and fastener assembly is inserted into either or both pole ends 20 and is pressed therein until the inserts 16 are snapped into engagement therein.

A method of assembling a pole connector assembly 14 according to the illustrated preferred embodiment of the present invention will now be discussed by way of example only. First, an insert 16 is preferably inserted into each of the open ends 20 of two pole sections 12 to be connected. The leading surfaces 44 and the tapered edges 46 of the inserts 16 preferably slide past the tongues 42 on the interior surfaces of the pole sections 12. As the cap portions 28 contact the pole ends 20, the tongue 24 preferably slides into engagement with the grooves 42 on the projections 36. With the inserts now connected to the pole sections 12, the fastener 18 is preferably threaded into one of the inserts 16, forcing the projections 36 to expand and engage the interior surface and tongue 24 of the pole section 12 more tightly. The other insert 16 is then preferably threaded onto the fastener 18 until the interface surfaces 32 of the two inserts 16 contact each other. Preferably, the fastener 18 is fully threaded into both inserts 16 when the interface surfaces 32 of the inserts 16 are in contact with one another.

When the interface surfaces 32 are in contact with one another, the peripheral edges 24 of these surfaces preferably form a shelf or rack groove to which a shelf or rack 2 can be connected. In some alternative embodiments however, no part of one insert or both inserts 16 is visible after the fastener 18 has been completely tightened and the interface surfaces 32 are in abutting relationship (such as when the cap portion 28 of the inserts 16 have a diameter that is smaller than the inner diameter of the pole sections 12).

Although the above method for assembling the pole connector assembly 14 is preferred, one having ordinary skill in the art will appreciate that the pole connector assembly 14 and pole sections 12 can be assembled in other ways still resulting in a structure falling within the spirit and scope of the present invention.

The spreading action of the projections 36 in the illustrated preferred embodiment of the present invention is generated by threading the fastener 18 into the insert 16 and between the projections 36. This deflection action is even possible where the insert 16 has only one projection 36, in which case the projection 36 is preferably pushed by the threaded fastener 18 toward an interior wall of the pole section 12. It will be appreciated by one having ordinary skill in the art that the projections 36 can be deflected to press against an interior wall of the pole section 12 and/or against a projection, recess, or other feature associated with the interior wall (e.g., a tongue 24 as described above) in a number of other manners, each of which falls within the spirit and scope of the present invention.

For example, the fastener 18 can instead be ribbed or have a series of lips or other protrusions to act as a ratchet. In such an example, as the fastener 18 is forced into the insert aperture 26 between the projections 36, the fastener 18 pushes the projections 36 apart and toward the interior wall of the pole section 12. The ribs of the fastener 18 can take any shape desired, and in some highly preferred embodiments have a frusto-conical or wedge-shape so that the fastener 18 can readily move along the interior surfaces of the projections 36 in an insertion direction but resist movement in an opposite direction to help prevent inadvertent or unwanted withdrawal of the fastener 18. In some embodiments, each protrusion on the fastener 18 can have a lead face and a locking face with an angled surface therebetween. The angled surface tapers from the lead face to the locking face, due to a smaller size (e.g., narrow diameter) of the lead face. The protrusions on the fastener 18 therefore resist removal of the fastener 18 from the aperture 26 after the fastener 18 has been inserted between the projections 36.

In this regard, the aperture 26 can have a plurality of ribs, flanges, lips, pins, or other protrusions directed axially inward to engage the ribs of the fastener 18 as the fastener 18 is inserted into the aperture 26. The protrusions can be made of a resilient material that allows the fastener 18 to easily pass by the protrusions upon insertion, but resist the fastener 18 from being pulled out of the insert 16. As the fastener 18 is inserted into the aperture 26 in the insert 16, the protrusions on the fastener 18 push through the inwardly-directed ribs, flanges, lips, pins, or other protrusions of the projections 36, which prevent the fastener 18 from being pulled out of the aperture 26 as just described. Insertion of the fastener 18 also preferably causes the projections 36 to deflect toward the interior walls of the pole section 12 in order to engage the insert 16 within the pole section 12 as described above.

As described above, in other embodiments frictional engagement of the fastener 18 within the aperture 26 in the insert 16 is relied upon to secure the insert 16 within the pole section 12 and to secure the fastener 18 within the insert 16. In some of these embodiments, the outer diameter of the fastener 18 is the same or slightly larger than at least an inner portion of the aperture 26 in the insert 16. Preferably, the fastener 18 has a diameter that is sufficiently large to force the projections 36 of the insert 16 radially outward from the axis of the insert 16 when the fastener 18 is forced into the aperture 26. Frictional engagement between the fastener 18 and the insert 16 therefore secures the fastener 18 to the insert 16. Deflection of the projection(s) 36 caused by forcing the fastener 18 into the aperture 26 causes the projection(s) 36 to frictionally engage the inside walls of the pole section 12 and/or exert force upon those features and elements (e.g., tongue 24 and groove 42) connecting the insert 16 to the pole section 12.

In the illustrated preferred embodiment of the present invention, the fastener 18 is used to connect inserts 16 in adjacent pole sections 12. It should be noted that the present invention is not limited to the use of two inserts 16 in a pole connection assembly 14. Some pole connection assemblies according to the present invention employ only one insert 16 in one of the two pole sections 12 to be connected. An example of such a pole connection assembly is illustrated in FIG. 6, wherein elements and features corresponding to those of the embodiment illustrated in FIGS. 1–5 are numbered in the 100 series.

The pole connection assembly 114 in FIG. 6 is similar to the pole connection assembly 14 illustrated in FIGS. 1–5, with the exception that the pole connection assembly 114 has only one insert 116. Rather than employ an insert in both pole sections 112, one pole section 112 has an insert 116 while the other pole section 112 has an end that is partially or completely closed. The fastener 118 can be threaded into the insert 116 and into a threaded aperture 48 in the end of the second pole section 112 in order to connect the pole sections 112 together. Any other type of fastener 118 can instead be used to connect the insert 116 with the end of the second pole section 112 (whether closed or open and regardless of the shape of the second pole section 112).

Another example of an embodiment of the present invention having a single pole insert in the pole connection assembly is illustrated in FIG. 7. The elements and features of the pole connection assembly 214 in FIG. 7 corresponding to those of the embodiment illustrated in FIGS. 1–5 are numbered in the 200 series. Like the pole connection assembly 114 of the embodiment illustrated in FIG. 6, the insert 216 is received within and connected to one pole section end 220 in any of the manners described above with reference to the embodiment illustrated in FIGS. 1–5. The embodiment of the present invention shown in FIG. 7 illustrates the fact that the pole connection assembly of the present invention need not necessarily have a separate fastener to connect adjacent inserts (see FIGS. 1–5) or to connect an insert directly to a pole section (see FIG. 6). Rather than employ a fastener to connect the insert 216 and the first pole section 212 to the second pole section 212, the other end of the insert 216 has external threads which are threaded into an internally-threaded end 220 of the second pole section 212. Although a fastener is not required to help retain the insert 216 within the first pole section as described above (in which case the insert 216 can be retained within the pole section 212 in the various alternative manners described herein), such a fastener is preferred.

In an alternative embodiment illustrated in FIG. 8, the insert 316 can have an externally-threaded post, rod, or other extension permanently connected thereto or integral therewith for threaded connection to an internally-threaded aperture in a partially or fully-closed end of the second pole section 312. Other manners (e.g., not employing a threaded connection) of directly connecting an exposed end of the insert 316 to the second pole section 312 are possible, and fall within the spirit and scope of the present invention.

Yet another example of an embodiment of the present invention having a single pole insert in the pole connection assembly is illustrated in FIG. 9. The elements and features of the pole connection assembly 414 in FIG. 9 corresponding to those of the embodiment illustrated in FIGS. 1–5 are numbered in the 400 series. The insert 416 is preferably received within and connected to one pole section end 420 in any of the manners described above with reference to the embodiment illustrated in FIGS. 1–5. The second pole section 412 preferably has an externally-threaded post, rod, or other extension permanently connected to or integral with an end 420 of the second pole section 412. The end 420 of the second pole section 412 can be partially closed or fully closed as shown in FIG. 9. The externally-threaded post, rod, or other extension can be threaded into an aperture 426 in the insert 416 for connection of the second pole section 412 to the insert 416 and to the first pole section 412. Other manners (e.g., not employing a threaded connection) of connecting an extension of one pole section 412 to an insert 416 in another pole section 412 are possible, and fall within the spirit and scope of the present invention.

Figure 10:
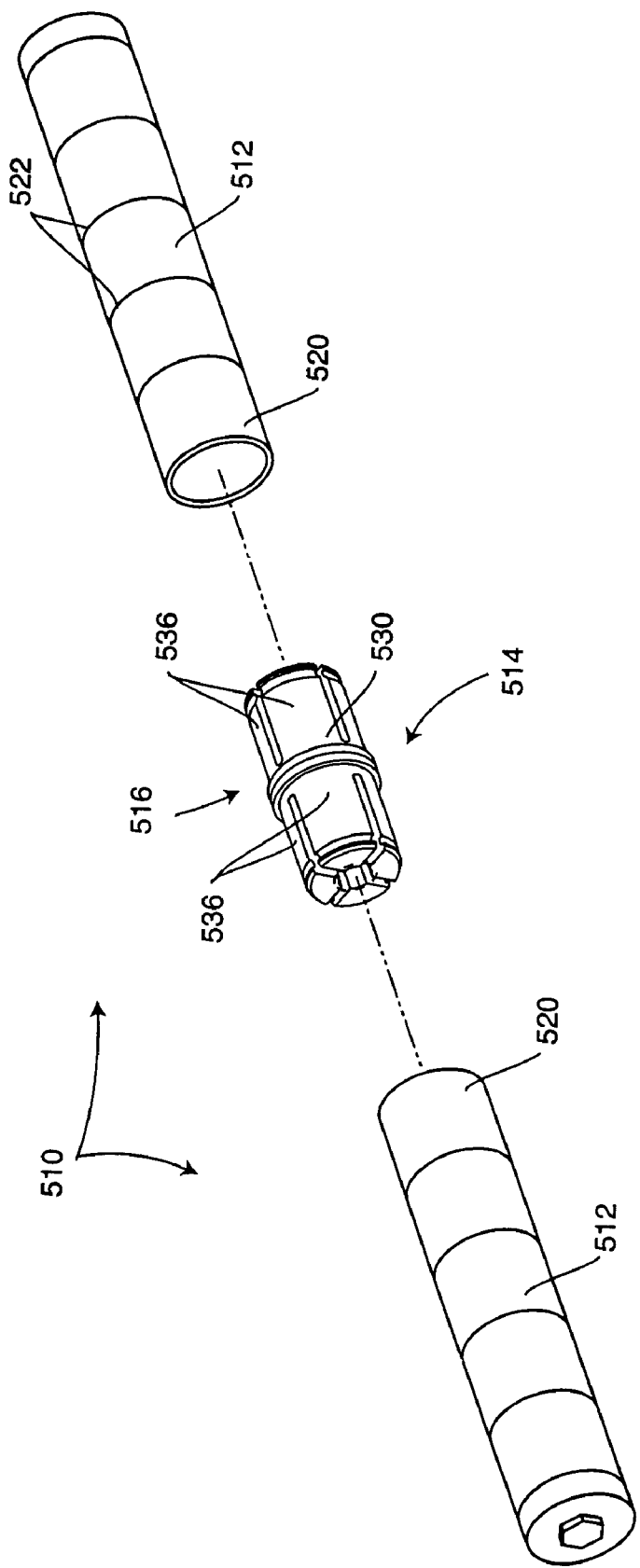
FIG. 10 is an exploded perspective view of a pole and pole connector assembly according to a sixth preferred embodiment of the present invention.

Another embodiment of the present invention having only one pole insert in a pole connection assembly is illustrated in FIG. 10. The elements and features of the pole connection assembly 514 in FIG. 10 corresponding to those of the embodiment illustrated in FIGS. 1–5 are numbered in the 500 series. The insert 516 preferably has projections 536 which extend in both directions away from a body portion 530 of the insert 516, and can have a shape similar to two inserts 16 of the first preferred embodiment connected back-to-back (i.e., with the interface surfaces 32 in contact with one another). The insert 516 can have a larger diameter center portion as illustrated in FIG. 10 similar in shape to the two adjacent cap portions 28 of the assembled connection assembly 14 in the first preferred embodiment. Alternatively, the insert 516 can have substantially the same diameter along its entire length. The insert 516 illustrated in FIG. 10 can be inserted into each of the ends 520 of two adjacent pole sections 512, each of which can have any of the features and elements described above with reference to the embodiment illustrated in FIGS. 1–5 in order to connect the insert 516 to the pole sections 512.

Another embodiment of the present invention is illustrated in FIGS. 11–14. The elements and features of the pole connection assembly 614 in FIG. 11 corresponding to those of the embodiment illustrated in FIGS. 1–5 are numbered in the 600 series. With the exception of mutually inconsistent features and elements between the embodiments discussed above and the pole connection assembly 614 depicted in FIGS. 11–14 and described in greater detail below, the same descriptions and alternatives provided above with reference to the other embodiments of the present invention apply equally to the features and elements of the pole connection assembly 614.

The exemplary pole connector assembly 614 of FIGS. 11–14 is shown connecting two pole sections 612 to form a pole 610. The pole connector assembly 614 includes two inserts 616 and at least one fastener 618. Similar to some of the embodiments described above and described in greater detail below, each insert 616 is inserted into an end 620 of a pole section 612 to be joined to another pole section 612. Preferably, the fastener 618 connects the inserts 616 together.

Also similar to the embodiments described above, the insert 616 is inserted into an open end of the pole section 612 and preferably snaps into place within the pole section 612. As will be described in greater detail below, the insert 616 preferably has a snap engagement with a tongue 624 (see FIG. 12) or other protrusion on the inside of the pole section 612 formed by at least one of the recesses 622 in the pole section 612. Other manners of engagement between the insert 616 and the pole section 612 are possible, as described in detail above.

Figure 11:
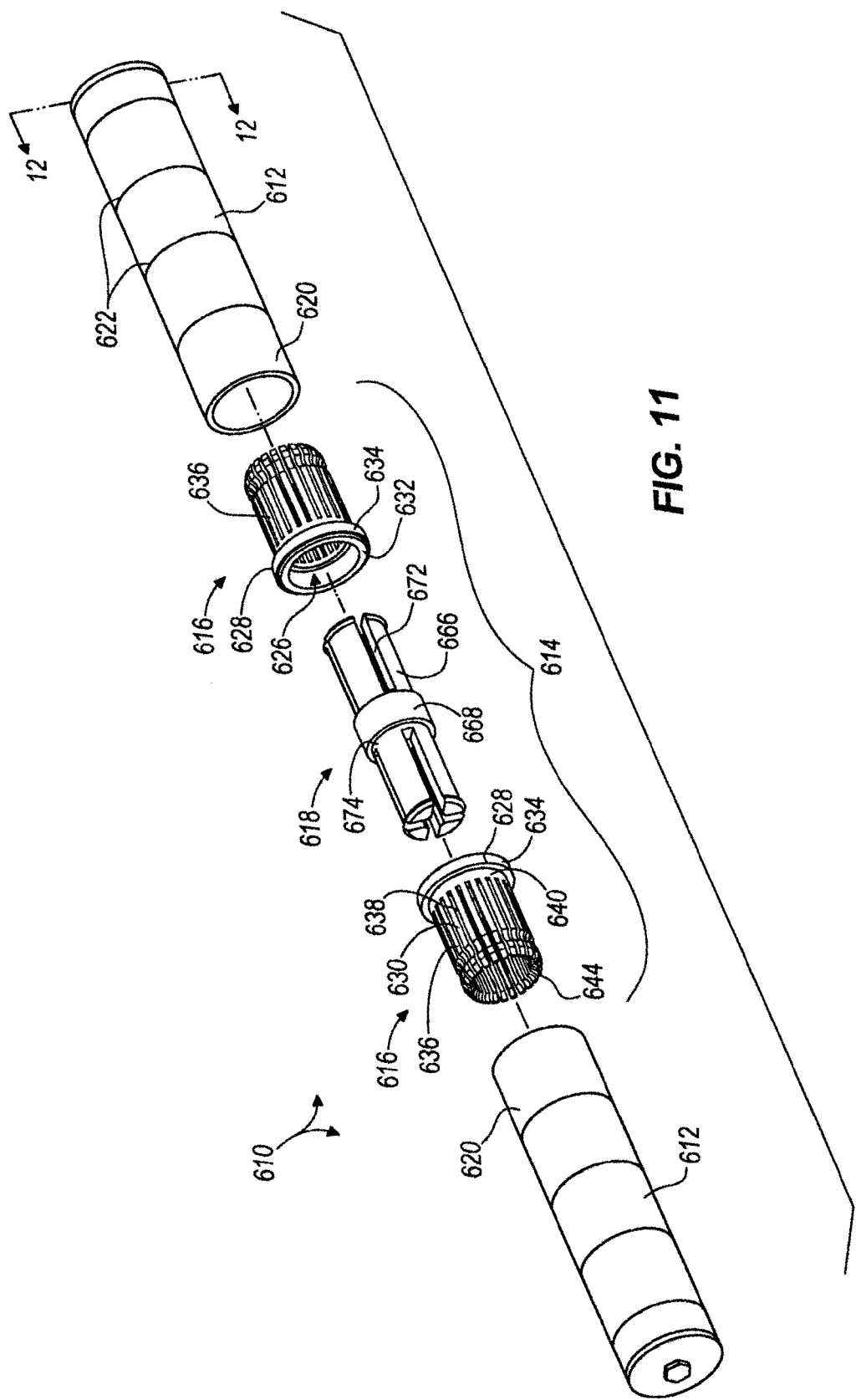
FIG. 11 is an exploded perspective view of a pole and pole connector assembly according to a seventh preferred embodiment of the present invention.
Figure 12:
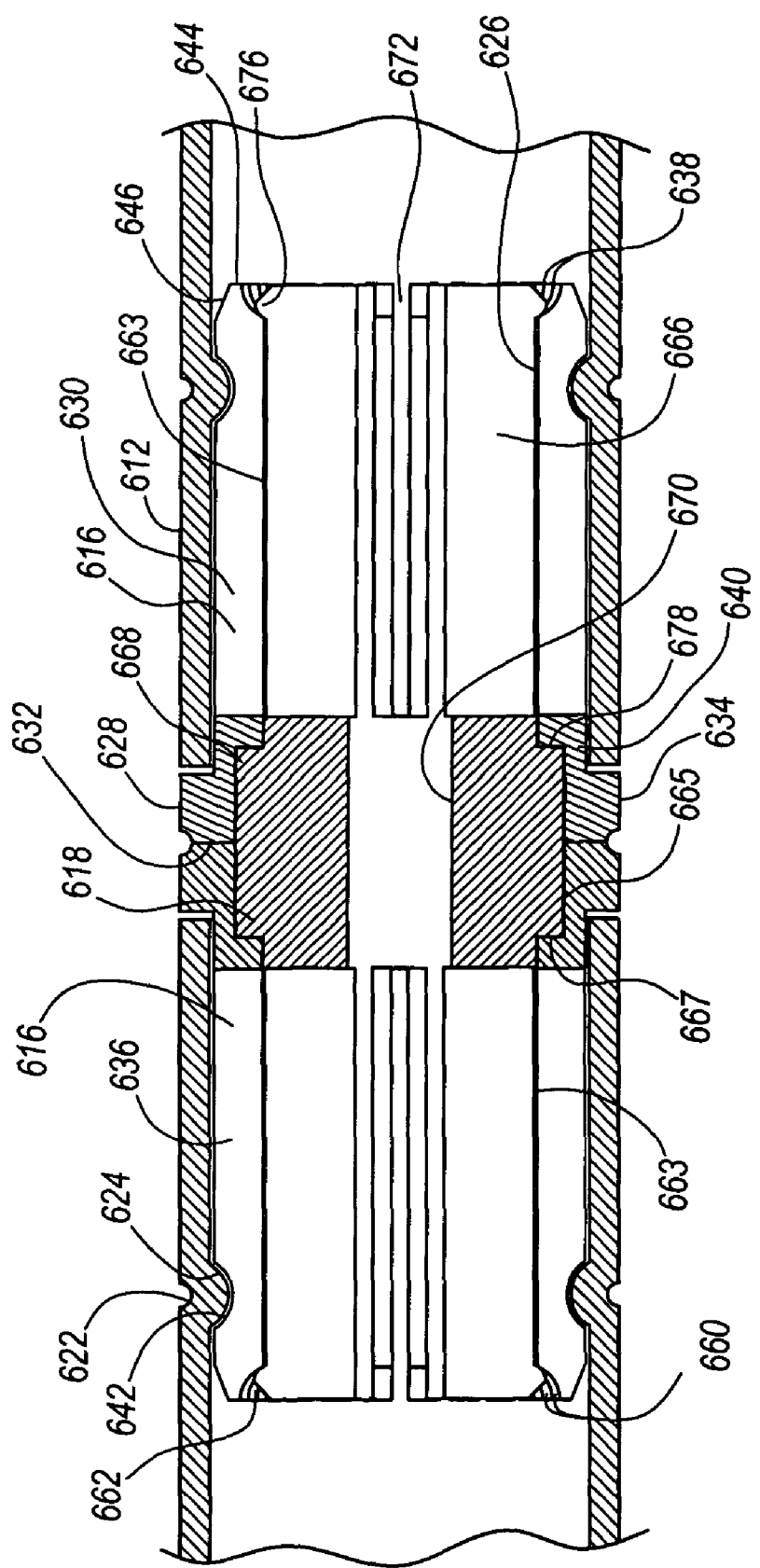
FIG. 12 is a elevational cross-sectional view of a pole connector assembly illustrated in FIG. 11.
Figure 13:
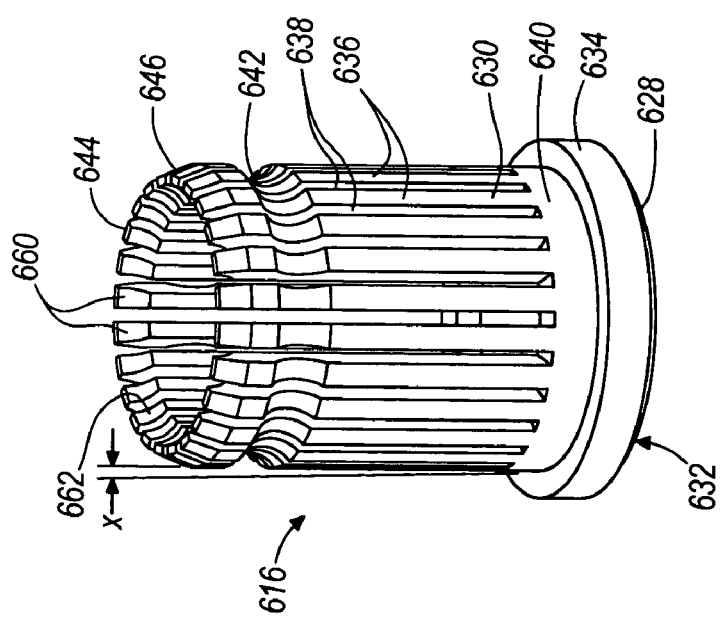
FIG. 13 is a perspective view of an insert of a pole connector assembly illustrated in FIGS. 11 and 12.

As show in FIGS. 11–13, the insert 616 has an aperture 626 (see FIG. 11) therein for receiving the fastener 618. The insert 616 preferably also has a body portion 630 that at least partially extends into an end 620 of a pole section 612. Also, similar to the embodiments described above, the insert 616 preferably has a cap portion 628 that is located at least partially outside of the pole section 612.

As illustrated in FIG. 13, the body portion 630 of the insert 616 can be tapered such that the end of the insert 616 that is inserted into the end 620 of the pole section 612 has a smaller cross-section than the opposing end of the insert 616. In some embodiments, this is an approximately 10° taper. In other embodiments, this is an approximately 5° taper, and in still other embodiments (as illustrated in FIG. 13), this is an approximately 1° taper. Other degrees of taper are possible and within the spirit and scope of the present invention.

As illustrated in FIG. 12, the aperture 626 of each insert 616 is defined by an interior surface 663, and a recess 665 defined in the interior surface 663. In some embodiments, the recess 665 is located at least partially in the cap 628. The recess 665 of the embodiment illustrated in FIGS. 11–13 is generally cylindrical but has a larger inner diameter than the diameter of the remainder of the body portion 630 of the insert 616, such that the aperture 626 has a stepped internal shape (i.e., a stepped internal diameter). In the illustrated exemplary embodiment, the recess 665 is separated from the remainder of the aperture 626 by an internal wall 667. The recess 665 is positioned to engage the fastener 618 as the fastener 618 is inserted within the insert 616, as will be described in greater detail below.

The insert 616 preferably has an interface surface 632 that faces away from the pole section 612 into which the insert 616 is inserted. Similar to the embodiments described above, this interface surface 632 can be substantially flat and featureless or can have any other shape desired. Also similar to the embodiments described above, the interface surface 632 can include a peripheral edge 634, which preferably has a circumferential groove, chamfer, or other recess defined therein. As best shown in FIG. 12, when one insert 616 is placed in abutting relationship with another insert 616, the resulting peripheral interface between the inserts 616 can define a recess having any desired shape. In some embodiments, the shape of the interface between the abutting inserts 616, as illustrated in FIG. 12, can be the same or similar to the shape of other external recesses 622 in the pole sections 612. Therefore, as described above, the interface between abutting inserts 616 can define another location at which shelves or racks can be connected to the pole 610. In other embodiments, however, no such recess is defined between adjacent and abutting inserts 616, or such inserts 616 are shaped to define a rib or other protrusion at their interface.

The body portion 630 of the insert 616 in the illustrated exemplary embodiment of FIGS. 11–13 has a generally round cross-sectional shape and has one or more projections 636 extending away from the base 640 of the insert 616. The projections 636 preferably extend in a direction generally parallel to the axis of the insert 616, and are preferably integral with the remainder of the insert 616. Similar to the embodiments described above, any number of projections 636 can be used. The embodiment illustrated in FIGS. 11–13 includes twenty-four projections 636. In the insert 616, the projections 636 are separated by slots 638 that are substantially parallel to the axis of the insert 616. The slots 638 extend from a base 640 of the body portion 630 to the ends of the projections 636.

The projections 636 of the insert 616 illustrated in FIGS. 11–13 have an external groove 642 that preferably circumscribes the body portion 630 of the insert 616 and formed in the outer surfaces of the projections 636. As best shown in FIG. 12, the groove 642 is preferably located at a point along the body portion 630 of the insert 616, such that the groove 642 engages the tongue 624 on the interior surface of the pole section 612 when the insert 616 is inserted into the open end 620 of the pole section 612. The groove 642 is preferably located near a distal end of the body portion 630.

In some embodiments, the projections 636 of the insert 616 also include a lead surface 644 having an outer curved or tapered edge 646. As with the embodiments described above, the tapered edge 646 of the lead surface 644 can act as a ramp against which the tongue 624 of the pole section 612 rides as the insert 616 is inserted into the pole section 612.

Also, in some embodiments, the projections 636 each include an inner concave surface 660 that collectively form an inwardly-opening groove 662 or a curved or tapered portion at the distal ends of the projections 636. The groove 662 (or curved or tapered portion) is positioned to engage at least a portion of the fastener 618 upon insertion of the fastener 618 into the aperture 626 of the insert 616 in connecting the pole sections 612, as will be described in greater detail below.

Figure 14:
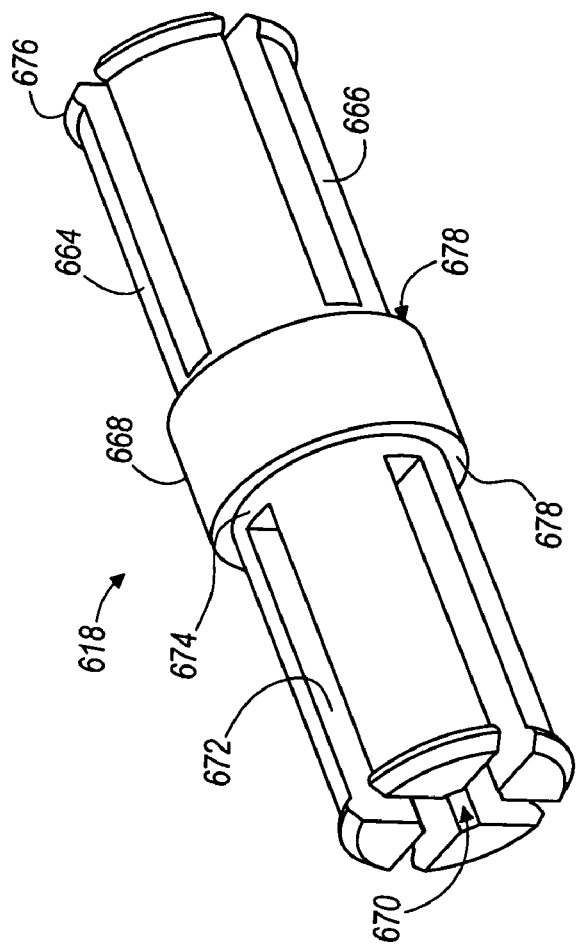
FIG. 14 is a perspective view of a fastener of a pole connector assembly illustrated in FIGS. 11 and 12.

The exemplary fastener 618 illustrated in FIGS. 11, 12 and 14 has a first end insertable into a first insert 616 and a first pole section 612 and a second end insertable into a second, confronting insert 616 and a second pole section 612. Since the first end of the fastener 618 is preferably identical to the second end of the fastener 618, only one end will be described in detail for simplicity, and like parts on both ends will be referred to with like numerals. The fastener 618 does not necessarily have identical first and second ends, and can simply include one end insertable into one insert 616 and a corresponding pole section 612 without departing from the spirit and scope of the present invention.

As best illustrated in FIG. 14, the fastener 618 according to some embodiments of the present invention includes a body portion 664 adapted to at least partially extend into the aperture 626 of the insert 616, and a collar portion 668 having a cross-sectional shape similar to that of the cap 628 of the insert 616. However, the collar portion 668 can have any other cross-sectional shape desired. In some embodiments, the cross-section of the aperture 626 of the insert 616 can be uniform (i.e., does not include the recess 665), and the fastener 618 accordingly can have a uniform outer diameter (i.e., does not include the collar portion 668 or internal wall 667). In such embodiments, the fastener 618 can be held within the insert 616 by a press-fit engagement or by other types of engagement or inter-engagement. An example of another type of inter-engagement is shown in the embodiment illustrated in FIGS. 11–14 and described below. If employed, the collar portion 668 of the fastener 618 can include an interface surface 678 positioned to engage the insert 616 as the fastener 618 is inserted within the aperture 626 of the insert 616, as described in greater detail below.

In some embodiments, the body portion 664 of the fastener 618 has one or more projections 666 that extend away from the collar portion 668. The projection(s) can extend in any direction away from the collar portion 668, and in some embodiments extend in a direction parallel to the axis of the fastener 618. The fastener 618 is preferably made of a strong and resilient material such as steel, aluminum, or other metal, high-strength plastic, composites, and the like. Similar to the projections of the inserts 616 described above, the projections 666 of the fastener 618 (if employed) can be separate elements attached the remainder of the fastener 618 in any conventional matter (such as by welding, soldering, or braising, by one or more conventional fasteners, by a press fit or threaded connection with the remainder of the fastener 618, and the like). More preferably however, the projections 666 are integral with the remainder of the fastener 618.

In those embodiments of the fastener employing projections 666 as just described, such fasteners 618 can be dimensioned and shaped to be received within the aperture 626 of the insert 616 and the corresponding pole section 612. In some of these embodiments, the fastener 618 further includes an aperture 670 that runs generally along the axis of the fastener 618 for the length of the fastener 618 and through the central collar portion 668. However, the aperture 670 can instead extend along any part of the fastener 618 (e.g., can extend along any length of the projections 666 and need not necessarily extend into or through the collar portion 668 as illustrated in FIGS. 11, 12 and 14).

The fastener 618 of FIGS. 11, 12, and 14 has four projections 666 on each end of the fastener 618. Similar to the insert projections of embodiments described above, the projections 666 preferably have a partially-annular cross-sectional shape, and are separated by slots 672 that are substantially parallel to the axis of the fastener 618. The shape and arrangement of the projections 666 of the fastener 618 can take any of the forms described above with reference to the projections of the inserts without departing from the spirit and scope of the present invention. In addition, the fastener 618 can take any shape, including those described above with reference to the insert. Such shapes and that all such shapes and arrangements fall within the spirit and scope of the present invention.

The slots 672 extend from a base 674 of the body portion 664 to the ends of the projections 666. The projections 666, each having a partially-annular cross-sectional shape, preferably collectively define a cross-sectional shape of the body portion 664 similar to that of the aperture 626 of the insert 616. In the embodiment illustrated in FIGS. 11, 12 and 14, the fastener 618 has a generally circular cross-sectional shape that fits within the generally circular cross-sectional shape of the aperture 626 in the insert 616.

In some embodiments of the present invention, each fastener projection 666 (if employed) includes an outwardly-protruding peripheral edge, lip, rib, or other protrusion 676, such that a distal portion of the projections 666, when in a relaxed state, collectively define an outer shape that is larger than the rest of the body portion 664 of the fastener 618 (or at least larger than other portions of the fastener projections 666). The outwardly-protruding peripheral edges 676 of the projection 666 can be shaped to engage the inwardly-opening groove 662 of the insert 616. The projections 666 and the outwardly-protruding peripheral edges 676 define an outer diameter (when the projections 666 are in a relaxed state) that is larger than the diameter of the aperture 626 defined by the insert projections 636 when the insert projections 636 are in a relaxed state. Therefore, as one end of the fastener 618 is inserted into the aperture 626 of an insert 616, the outwardly-protruding peripheral edges 676 can ride along an interior surface 663 of the body portion 630 of the insert 616. The projections 666 of the fastener 618 thereby inwardly deflect until the outwardly-protruding peripheral edges 676 reach a distal portion of the insert 616 (and in some cases, engage the inwardly-opening groove 662 or other mating portion of the insert 616).

The outwardly-protruding peripheral edges 676 of the fastener 618 can therefore resiliently snap-fit or otherwise engage with the inwardly-opening groove 662 of the insert 616 (if employed), thereby resulting in a strong and reliable connection between the fastener 618 and the insert 616. This engagement is best illustrated in FIG. 12. In other embodiments, the outwardly-protruding peripheral edges 676 of the fastener 618 are not received within a groove 662 or other recess in the insert 616 when sufficiently inserted, but nevertheless abut or engage one or more surfaces of the insert 616 to resist removal of the fastener 618 once the projections 666 return to an undeflected (or less deflected) position. Such an abutting or engaging relationship can exist at all times after sufficient insertion of the fastener 618 or can exist only when the fastener 618 is moved in a direction out of the insert 616.

In those embodiments of the fastener 618 having a collar portion 668 as described above, the fastener 618 can further engage the insert 616 via the collar portion 668 of the fastener 618. With reference to the illustrated embodiment of FIG. 12 by way of example only, the collar portion 668 of the fastener 618 is shaped to engage the recess 665 defined by the internal wall 667 when the fastener 618 is sufficiently inserted within the aperture 626 of the insert 616. With further reference to FIG. 12, when the inserts 616 are in abutting relationship, the recesses 665 of the inserts 616 become coextensive to form a single recess, and together abut the first and second interface surfaces 678 of the collar portion 668. In other embodiments, the inserts 616 need not necessarily be in abutting relationship when the fastener is fully inserted into both inserts 616. Also, in some embodiments the collar portions 668 are only retained within the recesses 665 of the inserts 616, and need not necessarily abut internal walls of the inserts 616. In still other embodiments, no such captured or retained relationship exists between the fastener 618 and that portion of the inserts 616 opposite the projections 666. In a broader sense, inter-engaging elements or features of the fastener 618 and the insert 616 (e.g., inter-engagement of the collar portion 668 and the outwardly-protruding peripheral edges 676 of the fastener 618 with portions of the insert 616) are not required to practice the present invention, but can be employed to generate a stronger connection in any of the manners described above, including those described above regarding previous embodiments.

As illustrated in FIGS. 11 and 12, each insert 616 can be inserted into an end 620 of a corresponding pole section 612. The projections 636 of each insert 616 are deflected inwardly as the outer tapered edge 646 of each projection 636 rides against the tongue 624 on the inside of the pole section 612. Upon sufficient insertion of the insert 616 into the pole section 612, the tongue 624 engages the external groove 642 on the insert 616. The projections 636 of the insert 616 can be deflected a relatively slight amount or as much as desired (determined at least in part by the shape and dimensions of the slots 638 and projections 636, and the shape and dimensions of the tongue 624).

In some embodiments, the relaxed outer diameter defined by the projections 636, collectively, can be sized such that the projections 636 are not deflected from the relaxed state by any amount once the tongue 624 of the pole section 612 has engaged the groove 642 of the insert 616. In other embodiments, the relaxed outer diameter of the projections 636 can be sized such that the projections 636 provide positive engagement with the interior of the pole section 612 and more fully engage the groove 642 of the insert 616 with the tongue 624 of the pole section 612. In still other embodiments, no tongue or other projection exists on the pole section 612 (or a corresponding mating groove 642 in the insert 616), in which case the relaxed state of the insert projections 636 can be slightly larger than the inside of the pole section 612. Therefore, in such embodiments, the insert projections 636 can be squeezed into the end 620 of the pole section 612 (in some cases, helped by the tapered or curved outer edge 646) and have a tight fit within the inside of the pole section 612 by their deflected force. The body portion 630 of the insert 616 (and/or the pole section 612) can be sized to provide a variety of loose and tight fits between the insert 616 and the pole section 612 without departing from the spirit and scope of the present invention.

With further reference to FIGS. 11 and 12, the first and second ends of the fastener 618 can be inserted into the corresponding inserts 616 and pole sections 612. The fastener 618 is shown as having deflectable projections 666 and having outwardly-protruding peripheral edges 676 that inter-engage the inwardly-opening groove 662 of the insert 616 collectively defined by the projections 636. In other embodiments, the fastener 618 can be shaped and/or sized to be press-fit into engagement with the interior surface 663 that defines the aperture 626. In some embodiments (similar to some of the embodiments described earlier), the fastener 618 can generate a more full engagement between the groove 642 of the insert 616 and the tongue 624 of the pole section 612 as the fastener is inserted into the aperture 626.

However, in some embodiments, the fastener 618 can simply comprise a rod, tube, post, plug, or other element that is shaped and dimensioned to fit within the aperture 626 of the insert 616 to inhibit or limit inward deflection of the insert projections 636 such that the insert 616 is not removable from the pole section 612. A fastener 618 according to such embodiments would not necessarily have any structure that inter-engages the insert 616. Furthermore, such a fastener 618 does not need to provide any additional positive engagement or more fully engage the groove 642 of the insert 616 with the tongue 624 (if employed). A fastener 618 according to such embodiments can have any cross-sectional shape desired, can be completely solid or hollow, and can be formed of any suitable material. That is, the fastener 618 can be rigid or at least partially deformable such that the fastener 618 deforms at least partially upon insertion into the insert 616.

It will be appreciated that any combination of elements from any of the embodiments described above can form a pole connection assembly according to the present invention. For example, a deformable or deflectable fastener can be used in combination with any of the above-described inserts. Also by way of example only, a threadless, rigid fastener can be used in combination with any of the above-described inserts to limit movement of the insert projections, thereby at least partially inhibiting the insert from being removed from a corresponding pole section.

The fastener 618 illustrated in FIGS. 11, 12 and 14 includes deflectable projections 666 as discussed above. When the fastener 618 is inserted into aperture 626 of the insert 616, the outwardly-protruding peripheral edges 676 of the distal portion of the projections 666 ride along the interior surface 663 of the aperture 626 as described above, thereby causing inward deflection of the projections 666. Upon insertion of the fastener 618 into the insert 616, the projections 666 can be deflected inwardly to any degree (e.g., from a relatively small amount to as much as possible) as described above. In some embodiments, after the fastener 618 has been sufficiently inserted into the insert 616, the projections 666 of the fastener 618 can return partially or fully to their relaxed and undeflected states.

For example, in the illustrated embodiment of FIGS. 11–14, the outwardly-protruding peripheral edges 676 can inter-engage the inwardly-opening groove 662 of the insert 616 as the fastener 618 is inserted further into the aperture 626 of the insert 616. This inter-engagement allows the projections 666 to deflect outwardly back to their pre-deflected state, which may be a position in which the projections 666 do not touch the insert 616 or are not biased against the insert 616, a position in which the projections 666 positively engage the interior surface 663 of the insert 616, or in any position therebetween. In addition, as the fastener 618 is inserted into the insert 616 of FIGS. 11–13, the interface surface 678 of the fastener 618 is received within the internal wall 667 of the insert 616, and the collar portion 668 of the fastener 618 is received within the recess 665 of the insert 616, thereby allowing the pole connector assembly 614 to connect two pole sections 612 without requiring the use of any threading or twisting actions.

The inserts illustrated in the accompanying drawings and described above have a tongue and groove or other inter-engaging connection with the pole sections. However, in some embodiments and as mentioned above, the inserts can fit tightly within the pole sections without the use of a tongue-and-groove connection, and the fastener can be used to secure the insert within the corresponding pole connection, with or without the fastener causing positive engagement (or further positive engagement) between the insert and the pole section.

Many of the fasteners in the embodiments illustrated in the figures and described above are substantially elongated in shape and are employed to connect pole sections in an end-to-end fashion. However, it will be appreciated that a variety of other fastener shapes can be used and can be employed to connect pole sections in any other orientation. A number of embodiments of the present invention can be advantageously employed when it is desirable to assemble the connector assembly without threading or twisting actions. For example, in some embodiments the fastener can be U-shaped, and therefore function as a handle or lift point for transportation of assembled poles, racks and/or shelves. As another example, in some assemblies it is not practical or desirable to thread or twist poles together, such as when the poles are connected by an assembly according to the present invention but are not parallel to one another in their assembled state or are parallel but not coaxial to one another. In such cases, the fasteners can be L-shaped, U-shaped, or have any other shape suitable for connecting the poles together. Also, it should be noted that any of the fasteners described and illustrated herein can have tapered ends that are received within the apertures of the inserts or can have a tapered center such that the cross-section of the fastener is largest at the ends. Still other fastener shapes are possible and within the spirit and scope of the present invention.

As is clear from the various embodiments of the present invention described above and illustrated in the figures, the present invention is not limited to connection assemblies having two inserts, but includes connection assemblies having one insert received within one or both pole sections of a pair of pole sections. Furthermore, although several embodiments of the present invention employ a fastener to connect two inserts together or to connect an insert in one pole section directly to another pole section, some embodiments of the present invention do not employ a separate fastener. Other embodiments employ a fastener for the purpose of deflecting the projections as described above in order to secure or more fully secure an insert within a pole section end. For example, the fastener can be threaded into an aperture of an insert as described above, but does not connect the insert to another insert or to another pole section.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims. For example, the inserts 16 of the present invention need not necessarily be hub-shaped as illustrated in the figures. Instead, the inserts 16 can have a base that has a cross or spider shape and from which relatively thin, elongated fingers extend into the pole ends 20. The fingers are moved by the fastener 18 as the fastener 18 is inserted between the fingers. Like the projections 36 in the embodiments described above, the fingers are preferably deflected by the fastener to press against or otherwise engage the interior walls of the pole section 12 in order to secure the inserts 16 within the pole section 12. The fingers can also engage with the fastener (e.g., by threads, ribs, frictional engagement, and the like) to resist or prevent the fastener from backing out once installed between the fingers.

We claim:

1. A pole connector assembly for connecting first and second pole sections, the pole connector assembly comprising:
   an insert dimensioned to be received within an end of the first pole section, the insert having a one-piece unitary body, an aperture defined in the one-piece unitary body, and a deflectable portion of the one-piece unitary body; and
   a deformable fastener having a first end insertable into the aperture, the fastener having at least one surface positioned to contact and limit deflection of the at least one deflectable portion to less than that needed to permit removal of the insert from the first pole section, the fastener also having a second end insertable to the second pole section.

2. The pole connector assembly as claimed in claim 1, wherein the deflectable portion of the one-piece unitary body comprises at least one projection, the at least one projection being deflectable with respect to a remainder of the one-piece unitary body, and wherein the fastener is insertable into the aperture to limit inward deflection of the at least one projection of the insert.

3. The pole connector assembly as claimed in claim 1, wherein the fastener further comprises a base and at least one projection extending from the base, the at least one projection being deflectable with respect to the base of the fastener.

4. The pole connector assembly as claimed in claim 3, wherein the at least one projection of the fastener is shaped to engage the insert in a tongue-and-groove connection.

5. The pole connector assembly as claimed in claim 2, further comprising a recess in an end of the at least one projection, wherein the fastener further comprises at least one projection received within the recess in an inserted position of the fastener in the aperture.

6. The pole connector assembly as claimed in claim 2, wherein the fastener is insertable into the insert to deflect the at least one projection toward an internal surface of the first pole section.

7. The pole connector assembly as claimed in claim 2, wherein the fastener is insertable within the insert without appreciable deflection of the at least one projection.

8. The pole connector assembly as claimed in claim 1, wherein the fastener is U-shaped.

9. The pole connector assembly as claimed in claim 1, wherein the fastener is insertable into the aperture in a press-fit engagement.

10. The pole connector assembly as claimed in claim 1, wherein the fastener is insertable into the aperture to frictionally engage the fastener in the insert.

11. A pole connector assembly for connecting first and second pole sections, the pole connector assembly comprising:
    an insert dimensioned to be received within an end of the first pole section, the insert having:
       an insert body having at least one portion being deflectable with respect to a remainder of the insert body; and
       an aperture defined in the insert body; and
    a fastener having a first end insertable into the aperture and movable to a position with respect to the at least one portion of the insert body in which a surface of the fastener contacts and substantially limits deflection of the at least one portion of the insert body to less than that needed to permit removal of the insert from the first pole section, a second end insertable to the second pole section, and a fastener body having at least one inwardly-deflectable portion.

12. The pole connector assembly as claimed in claim 11, wherein the first end of the fastener is insertable into the aperture to deflect the at least one portion of the insert body toward an internal surface of the first pole section.

13. The pole connector assembly as claimed in claim 11, wherein insertion of the fastener into the aperture generates no appreciable deflection of the at least one portion of the insert body.

14. The pole connector assembly as claimed in claim 11, wherein the fastener further comprises a collar portion shaped to be received in at least a portion of the insert, the collar portion having an enlarged cross-sectional area relative to a remainder of the fastener.

15. The pole connector assembly as claimed in claim 11, wherein the at least one portion of the insert body includes at least ten projections.

16. The pole connector assembly as claimed in claim 11, wherein the at least one portion of the insert body includes at least four projections.

17. The pole connector assembly as claimed in claim 11, wherein the at least one portion of the insert body is shaped to engage an internal wall of the first pole section.

18. The pole connector assembly as claimed in claim 11, wherein the at least one inwardly-deflectable portion of the fastener body is shaped to engage an internal wall of the insert in at least one of a tongue-and-groove engagement and a snap-fit engagement.

19. The pole connector assembly as claimed in claim 11, further comprising a recess defined in an end of the at least one portion of the insert body, wherein the at least one inwardly-deflectable portion of the fastener body defines an enlarged end of the fastener shaped to be received within the recess in the insert body.

20. The pole connector assembly as claimed in claim 11, wherein the first and second ends of the fastener each have at least one inwardly-deflectable portion.

21. The pole connector assembly as claimed in claim 11, wherein the fastener is U-shaped.

22. A pole connector assembly for connection of two sections of a pole, the pole connector assembly comprising:
    an insert having a deflectable portion, the insert being dimensioned to be received within an end of a first pole section, the insert having a body portion and an aperture defined in the body portion; and
       a deformable fastener engagable within the aperture in the body portion of the insert and connectable to a second pole section, the deformable fastener having a position within the insert in which a deformable portion of the deformable fastener located within the first pole section prevents removal of the insert from the first pole section.

23. The pole connector assembly as claimed in claim 22, wherein the fastener is resiliently deformable.

24. The pole connector assembly as claimed in claim 22, wherein the fastener is resiliently engageable with an internal wall of the insert at least partially defining the aperture.

25. The pole connector assembly as claimed in claim 22, wherein the fastener includes at least one projection, the at least one projection deflectable with respect to a remainder of the fastener upon insertion of the fastener into the insert.

26. The pole connector assembly as claimed in claim 25, wherein the at least one projection of the fastener has an outwardly-protruding enlarged end engagable with an end of the insert in an inserted position of the fastener in the insert.

27. The pole connector assembly as claimed in claim 22, wherein the fastener is generally U-shaped.

28. A pole assembly, comprising:
   a first pole section;
   a second pole section;
   a first insert received within the first pole section;
   a second insert received within the second pole section;
   each of the first and second inserts having:
      a base;
      at least one deflectable projection extending from the base; and
      an aperture defined in the base; and
   a fastener having opposite ends received within the apertures of the first and second inserts, the fastener having a base and at least one deflectable projection extending from the base, the at least one deflectable projection of the fastener inter-engageable with the insert to limit inward deflection of the at least one deflectable projection of the insert.

29. The pole assembly as claimed in claim 28, wherein the at least one deflectable projection of the fastener includes an outwardly-protruding enlarged end engagable with a terminal end of one of the first and second inserts.

30. The pole assembly as claimed in claim 28, wherein the fastener further comprises a collar portion shaped to be received within at least one of the first and second inserts.

31. The pole assembly as claimed in claim 28, wherein the fastener is U-shaped.

32. The pole assembly as claimed in claim 28, wherein the ends of the fastener are insertable into the apertures of the first and second inserts to deflect the deflectable projections of the first and second inserts toward internal surfaces of the first and second pole sections.

33. The pole assembly as claimed in claim 28, wherein the ends of the fastener are each insertable into the apertures of the first and second inserts without generating appreciable deflection of the deflectable projections of the first and second inserts.

34. A method of assembling a pole, comprising:
   inserting a first insert into an end of a first pole section, the first insert having at least one inwardly-deflectable projection;
   inserting a fastener comprising at least one projection into an aperture in the first insert,
   wherein the at least one projection of the fastener is deflectable with respect to a remainder of the fastener;
   contacting a portion of the fastener with the at least one inwardly-deflectable projection of the insert;
   limiting inward deflection of the at least one inwardly-deflectable projection of the insert with the portion of the fastener; and
   coupling the fastener to a second pole section,
   wherein inserting the fastener includes deflecting the at least one projection of the fastener.

35. The method as claimed in claim 34, wherein:
   the fastener comprises
   an outwardly-protruding enlarged end; and
   inserting the fastener includes deflecting the at least one projection of the fastener until the outwardly-protruding enlarged end is inserted through the aperture in the insert.

36. The method as claimed in claim 34, wherein:
   the fastener is deformable; and
   inserting the fastener includes deforming at least a portion of the fastener.

37. The method as claimed in claim 36, wherein inserting the fastener includes resiliently deforming at least a portion of the fastener.

38. The method as claimed in claim 34, wherein the at least one inwardly-deflectable projection of the insert is deflected outwardly responsive to inserting the fastener.

39. The method as claimed in claim 34, wherein coupling the fastener to the second pole section includes performing the limiting and coupling steps with a second insert and a second pole section.

* * * * *